United States Patent Office 3,116,484
Patented Dec. 31, 1963

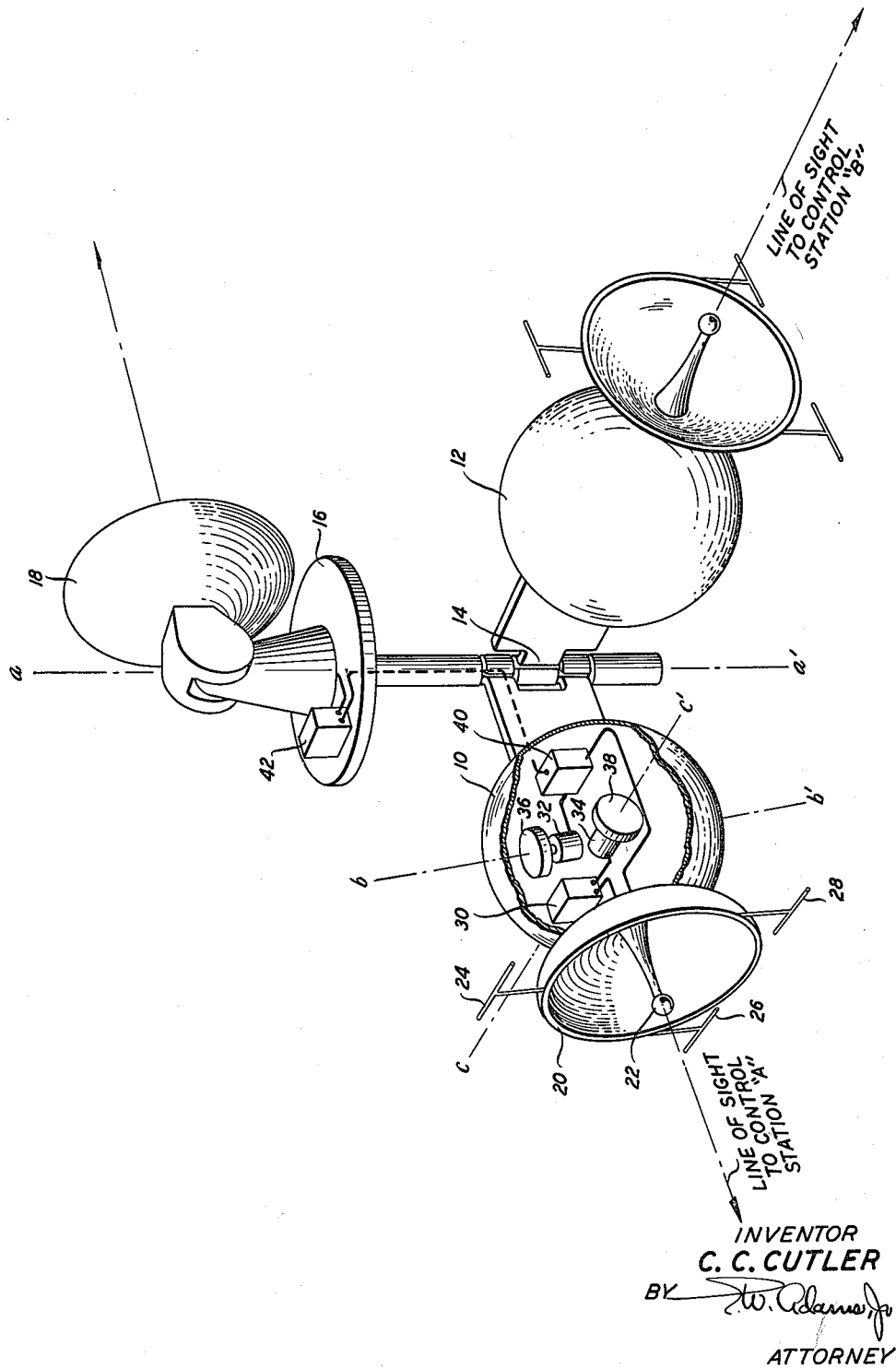

3,116,484
SPACE SATELLITE VEHICLES
Cassius C. Cutler, Gillette, N.J., assignor to Bell Telephone Laboratories, Incorporated, New York, N.Y., a corporation of New York
Filed Nov. 18, 1959, Ser. No. 853,944
4 Claims. (Cl. 343—100)

This invention relates to space vehicles and, more particularly, to space satellite vehicles for use as terminal or repeater stations in microwave or other communication systems.

There have been many recent proposals for long range communication systems to be used between points on earth or between the earth and/or celestial bodies which involve the use of one or more intermediate repeater stations comprising artificial space satellites. The simplest systems heretofore proposed involve the use of passive repeater stations wherein the satellite vehicle comprises nothing more than a reflector of suitable configuration which acts to redirect line-of-sight signals from a transmitting station to a second station not visible from the location of the transmitting station. More sophisticated systems involve active repeaters wherein the space vehicle carries appropriate equipment for receiving, amplifying and retransmitting signals originating at one terminal station and intended for transmission either directly or by way of additional repeater stations to another terminal station located at a point beyond the line-of-sight limitation.

Whether active or passive repeaters as above described are involved, it becomes important to provide for control of the spatial orientation of the satellite vehicle to be employed as a repeating station. Unless a highly inefficient isotropic reflector or antenna system is provided, it is necessary to so orient the antennas or reflectors provided on the vehicle as to permit selective reception and/or transmission with an increased efficiency. Various proposals have been advanced for controlling the orientation of artificial satellite vehicles and perhaps the simplest of these involves stabilizing the vehicle by launching it with an initial spin about an axis normal to the desired orbit and providing means for maintaining this spin despite the various influences tending to degrade the initial spin. Such vehicles are, however, limited to use in rather specific orbits, and more complicated proposals have been made for controlling the orientation of a satellite vehicle to be used in any desired orbit.

Typical of such proposals is that described in my copending application Serial No. 843,737, filed October 1, 1959, now U.S. Patent 3,060,425, October 23, 1963. In the arrangement there described, a chosen reference axis of the satellite vehicle is oriented in such a way as always to be directed along the line of sight from the vehicle to the control station. This is accomplished by a system wherein the orientation of that particular axis of the satellite (or that of a plane normal to that axis) is measured at the control station by interferometric methods and the orientation so determined is compared with the desired orientation to generate control signals which may be radiated to the satellite for remote control purposes. Conveniently, the actual attitude of the satellite may be adjusted in response to remote control signals through the use of principles of conservation of momentum. As described in the above-identified copending application, small masses are mounted for rotation about orthogonal axes of the satellite and are appropriately driven by motors in response to remote control signals.

The above and other proposed attitude control systems become exceedingly complicated when it is desired to so maintain a space vehicle in space that it provides a uniquely fixed or controllable stable platform. This normally requires the control of rotations of the satellite about at least three axes by independent control systems. Such control is necessary, however, in many cases. Thus, when the vehicle is to serve as a platform for an antenna which is at all times to be directed to a particular receiving point, the orientation of the platform must be fixed (in the case of a satellite in twenty-four hour orbit) or predictable from knowledge of the orbit.

It is accordingly the object of the present invention to simplify the attitude control systems required for stable space platforms or vehicles.

In accordance with the above object, an earth satellite or space platform is remotely controlled from two control stations in such a way as to maintain a reference thereon in fixed or predictable orientation with respect to these stations. The satellite vehicle comprises two portions, each of which is supplied with a remote control system adequate to orient it in space with a predetermined axis in alignment with the line of sight to one of the control stations. The two portions of the vehicle are hinged together and are relatively movable only about a single axis which serves also as the reference referred to above. Such a satellite, when controlled by the two stations to align the two predetermined axes, is held in fixed or determinable spatial orientation and may be used as a stable platform for the support of antennas, reflectors, or other equipment.

The above and other features of the invention will be described in the following specification taken in connection with the drawing, the single FIGURE of which is a schematic view in perspective of a space vehicle according to the invention.

As shown in the drawing, the space vehicle of the invention comprises two body portions 10 and 12 which are joined together for relative movement only about axis $a$—$a'$ by a hinged structure represented at 14. It is required that hinge axis $a$—$a'$ be mounted in fixed or determinable spatial orientation so that a platform 16 mounted thereon may serve as a stable platform upon which an antenna such as that shown at 18 may be mounted. For this purpose, each of body portions 10 and 12 is provided with a remote control orientation system capable only of controlling the orientation of a particular predetermined axis of that respective body portion. Since the two portions 10 and 12 and the orientation systems provided for use therewith are identical, further description will be limited to the equipment provided for vehicle body portion 10.

Since body portions 10 and 12 may move relatively only about a single axis, it is necessary only to control the spatial orientation of a reference plane attached to the body portion. The arrangement disclosed in my copending application referred to above serves adequately for this purpose. Thus, there are mounted on body 10 both transmitting and receiving antennas which form one terminal of a control system, the other terminal of which is remotely located. Conveniently, a parabolic reflector antenna 20 with conventional feed 22 may serve as the receiving antenna for a telemetry channel while antennas 24, 26 and 28, mounted on the periphery of the parabolic reflector 20 in triangular configuration, serve as transmitting antennas for signals from which the orientation of the plane defined by the three antennas may be determined at a remote station. As shown, the plane in which antennas 24, 26 and 28 are mounted is normal to an axis designated in the drawing as "line of sight to control station A." If, as taught in my copending application, separate double-sideband, suppressed-carrier signals, all generated from the same carrier, are radiated from the three antennas 24, 26 and 28, equipment at a remote station may be employed to determine from the phase relationships existing between the several received sideband pairs whether or not the plane in which the three transmitting antennas are located is normal to the line of sight extending from the vehicle to that control station. Briefly, in such a system, one pair of sidebands corresponding, for example, to that radiated from antenna 24 is employed to reconstitute the carrier which was used to generate the sidebands, and the reconstituted carrier is employed to demodulate the other sideband pairs yielding signals, the amplitude and polarity of which represent differences in the phase of the radio frequency signals caused by misalignment of the reference plane on the satellite from normality to the line-of-sight axis.

The two error signals so produced are retransmitted to the satellite and are received by antenna 20 from which they are directed to a telemetry receiver shown schematically at 30. This receiver may be of well-known design and is required only to produce in two separate output channels signals which are respectively proportional to the two error signals produced at the control station. These error signals are employed to produce rotations of body portion 10 about a pair of orthogonal axes, for example, $b$—$b'$ and $c$—$c'$, which are normal to the line of sight to the control station. For the purpose of producing rotations of satellite body portion 10 about these axes, $b$—$b'$ and $c$—$c'$, small motors 32 and 34 are mounted within the body portion and arranged to rotate masses 36 and 38, respectively, about these axes. It will be understood that in accordance with the laws of conservation of momentum, a rotation of mass 36 about axis $b$—$b'$ in one direction must be balanced by a rotation of body portion 10 about the same axis in the opposite direction. Obviously because of the differences in masses involved, many rotations of mass 36 will be required at relatively high angular velocity to produce a small rotation at relatively low angular velocity of body portion 10. In similar fashion, motor 34 driving mass 36 can produce rotations of body portion 10 about axis $c$—$c'$.

These two adjustments of the orientation of body portion 10, taken alone, are sufficient to maintain the plane of antennas 24, 26 and 28 normal to the line of sight extending from satellite body portion 10 to control station A. It will be recognized, however, that this control system does not limit or permit control of rotations of satellite body portion 10 about the line-of-sight axis.

As has been indicated above, a control system identical in all respects to that provided on body portion 10 is provided on body portion 12 and serves to maintain a reference plane on body portion 12 normal to the line of sight to a second control station B. Here, too, there is no constraint placed by the control station upon rotations of body portion 12 about the line-of-sight axis extending from body portion 12 to control station B. However, body portions 10 and 12 are hinged together and may move relatively one to the other with only a single degree of freedom. Thus, as portions 10 and 12 are oriented by their respective remote control systems to fix the spatial orientations of reference planes attached respectively to the two portions, axis $a$—$a'$ (the hinge axis) will be appropriately displaced and so long as the two line-of-sight axes are fixed will also be fixed in space. Once the two line-of-sight axes are aligned with fixed remote stations, the spatial orientation of platform 16 is known and appropriate control signals may be transmitted if desired to orient antenna 18 with respect thereto. For this purpose a second receiver may be supplied from antenna 20, and such a receiver is shown schematically in body portion 10 at 40. Signals from this receiver may be transmitted to control apparatus 42 on stable platform 16 and employed in well-known fashion to control the orientation of antenna 18.

It will be evident that, unless the satellite vehicle is in a twenty-four hour orbit about the earth or in a corresponding orbit about some other celestial body upon which the control stations are located, the orientation of hinge axis $a$—$a'$ and thus of platform 16 will change as the satellite vehicle moves in orbit. It is pointed out, however, that such a change is fully predictable from knowledge of the orbit in which the vehicle is traveling and thus does not constitute a limitation upon the usefulness of the stabilization system described above. It should further be apparent that control of the vehicle may be switched from one pair of control stations to any other pair of control stations as required by the nature of the orbit and the mission of the space vehicle.

The embodiment of the invention illustrated in the drawing and described above has been simplified for ease of understanding by making the two line-of-sight axes which are subject to remote control intersect the hinge axes by which the two portions of the vehicle are joined. This is not necessary and any convenient reference axes for the respective halves of the satellite vehicle may be employed. In a similar fashion, the control axes for each of body portions 10 and 12 (i.e., the axes about which rotations of the respective body portions may be produced in response to remote control signals) are so selected in the arrangement shown in the drawing that none of them are parallel either to each other or to the hinge axis for any position of relative rotation of the two body portions about the hinge axis. This limitation upon generality of the arrangement is not necessary and the system as proposed will operate satisfactorily regardless of the relative orientations of these several axes so long as the two line-of-sight axes do not become parallel or coincident.

What is claimed is:

1. A satellite vehicle comprising first and second parts, means for joining said parts for relative rotation about a single hinge axis, a reference plane on each of said parts, means on each part responsive to external signals for independently orienting the respective reference planes to lie normal to predetermined directions, and equipment to be maintained in predictable spatial orientation mounted in fixed relation to said hinge axis, said equipment comprising a communication antenna, and means for orienting said antenna with respect to said hinge axis as a reference.

2. A satellite vehicle comprising first and second parts joined for relative rotation about a single hinge axis, attitude control equipment in each of said parts for controlling rotations of said part about orthogonal axes normal to a reference direction, means responsive to remotely generated control signals for causing such rotations to align the reference axis of each body portion with the line of sight to a remote control station, a communication antenna mounted on said hinge axis, means for orienting said antenna with respect to said axis as a reference, and means for receiving remotely generated signals for controlling said orientation means.

3. In a system for controlling the orientation of an earth satellite, a satellite vehicle comprising two parts movable with respect to one another only about a single hinge axis, first and second base stations, and servo control loops linking the two parts of the satellite vehicle respectively to said first and second base stations, said servo loops being arranged in each case to align a predetermined axis of that vehicle part with the line of sight from that part to the corresponding base station.

4. In a satellite vehicle system, a satellite vehicle comprising two parts movable with respect to one another only about a single hinge axis, first and second base stations and servo control loops linking the two parts of the satellite vehicle respectively to said first and second base stations, said servo loops being arranged in each case to a line of predetermined axis of that vehicle part with the line of sight from that part to the corresponding base station, a communication antenna mounted upon said hinge axis, and means for orienting said antenna with respect to said hinge axis as a reference.

References Cited in the file of this patent

UNITED STATES PATENTS

| | | |
|---|---|---|
| 1,707,690 | Sperry | Apr. 2, 1929 |
| 2,379,363 | Lear | June 26, 1945 |
| 2,569,485 | McLennan | Oct. 2, 1951 |

OTHER REFERENCES

Angle, "Attitude Control Techniques," Navigation, V6, N1, Spring 1958, pp. 66–71.